United States Patent
Cheng et al.

(10) Patent No.: US 8,996,341 B2
(45) Date of Patent: *Mar. 31, 2015

(54) GENERATING AND EVALUATING EXPERT NETWORKS

(75) Inventors: Winnie W. Cheng, Jersey City, NJ (US); Gengxin Miao, Elk Grove, CA (US); James R. Moulic, Poughkeepsie, NY (US); Shu Tao, Irvington, NY (US)

(73) Assignee: International Business Machines Corporation, Armonk, NY (US)

( * ) Notice: Subject to any disclaimer, the term of this patent is extended or adjusted under 35 U.S.C. 154(b) by 373 days.

This patent is subject to a terminal disclaimer.

(21) Appl. No.: 13/610,116

(22) Filed: Sep. 11, 2012

(65) Prior Publication Data

US 2014/0075318 A1 Mar. 13, 2014

(51) Int. Cl.
*G06G 7/48* (2006.01)
*H04L 12/24* (2006.01)

(52) U.S. Cl.
CPC ............. *H04L 41/142* (2013.01); *H04L 41/22* (2013.01); *H04L 41/0816* (2013.01); *H04L 41/145* (2013.01); *Y04S 40/162* (2013.01)
USPC .......................................................... 703/6

(58) Field of Classification Search
USPC ............................ 703/2, 6, 13; 716/12, 46, 52
See application file for complete search history.

(56) References Cited

U.S. PATENT DOCUMENTS

| | | | |
|---|---|---|---|
| 7,519,542 B1 | 4/2009 | Waingold | |
| 2006/0036563 A1 | 2/2006 | Wu | |
| 2006/0159095 A1 | 7/2006 | Cook et al. | |
| 2009/0024441 A1 | 1/2009 | Mehregany | |
| 2009/0059814 A1 | 3/2009 | Nixon et al. | |
| 2009/0327903 A1 | 12/2009 | Smith et al. | |
| 2010/0250744 A1 | 9/2010 | Hadad et al. | |
| 2010/0305915 A1 | 12/2010 | Behrens et al. | |
| 2011/0051715 A1 | 3/2011 | Grunwald et al. | |
| 2012/0011170 A1 | 1/2012 | Elad et al. | |
| 2012/0023044 A1* | 1/2012 | Anerousis et al. | 706/12 |

FOREIGN PATENT DOCUMENTS

WO PCT/US13/49086 1/2004

OTHER PUBLICATIONS

"Bugzilla," http://www.bugzilla.org, Jul. 2012, 2 pages.

(Continued)

*Primary Examiner* — Kandasamy Thangavelu
(74) *Attorney, Agent, or Firm* — Louis J. Percello; Ryan, Mason & Lewis, LLP

(57) ABSTRACT

A system comprises a modeling component, a routing component, a simulator component and a configuration component. The modeling component is operative to obtain at least one model of at least one collaborative network. The routing component is operative to model at least one routing pattern for one or more nodes of a given collaborative network. The simulator component is operative to simulate one or more virtual network topologies of the given collaborative network using the at least one model and the at least one routing pattern. The configuration component is operative to configure one or more given virtual network topologies on the given collaborative network. The collaborative network comprises a plurality of nodes and one or more edges between pairs of the plurality of nodes. The modeling component, routing component, simulator component and configuration component are executed by at least one processing device.

21 Claims, 5 Drawing Sheets

(56) References Cited

OTHER PUBLICATIONS

"Eclipse," http://www.eclipse.org, 2012, 4 pages.
"Mozilla," http://www.mozilla.org, 3 pages.
"Mining Challenge," Mining Software Repositories, http://2011.msrconf.org/msr-challenge.html, May 2011, 2 pages, Honolulu, Hawaii.
A.-L. Barbási et al., "Emergence of Scaling in Random Networks," Science, Oct. 1999, pp. 509-512, vol. 286, No. 5439.
M. Boguña et al., "Navigability of Complex Networks," Nature Physics, Nov. 2008, pp. 74-80, vol. 5, No. 1.
A. Clauset et al., "Power-Law Distributions in Empirical Data," Society for Industrial and Applied Mathematics (SIAM) Review, Nov. 2009, pp. 661-703, vol. 51, No. 4.
P. Domingos et al., "Mining the Network Value of Customers," 7th ACM SIGKDD International Conference on Knowledge Discovery and Data Mining, Aug. 2001, pp. 57-66.
P. Erdös et al., "On Random Graphs I.," Publicationes Mathematicae, 1959, pp. 290-297, vol. 6.
S. Galam, "Minority Opinion Spreading in Random Geometry," The European Physical Journal B, Jan. 2002, pp. 403-406, vol. 25, No. 4.
Serge Galam, "Modelling Rumors: The No Plane Pentagon French Hoax Case," Physica A: Statistical Mechanics and Its Applications, Sep. 2002, pp. 571-580, vol. 320.
X. Guardiola et al., "Modeling Diffusion of Innovations in a Social Network," The American Physical Society, Physical Review E, Aug. 2002, p. 026121-1-026121-4, vol. 66.
D. Kempe et al., "Maximizing the Spread of Influence Through a Social Network," 9th ACM SIGKDD International Conference on Knowledge Discovery and Data Mining, Aug. 2003, pp. 137-146.
Jon Kleinberg, "Small-World Phenomena and the Dynamics of Information," Advances in Neural Information Processing Systems (NIPS), Dec. 2001, pp. 431-438, vol. 14.
A.L. Lloyd et al., "How Viruses Spread Among Computers and People," Science, New Series, May 2001, pp. 1316-1317, vol. 292, No. 5520.
D. Makowiec, "Evolving Network—Simulation Study—From Regular Lattice to Scale Free Network," The European Physical Journal B, Nov. 2005, pp. 547-555, vol. 48.
K. Malarz et al., "Gossip in Random Networks," Acta Physica Polonica B, Nov. 2006, pp. 3049-3058, vol. 37, No. 11.
G. Miao et al., "Generative Models for Ticket Resolution in Expert Networks," 16th ACM SIGKDD International Conference on Knowledge Discovery and Data Mining, Jul. 2010, pp. 733-742.
Stanley Milgram, "The Small-World Problem," Psychology Today, May 1967, pp. 61-67, vol. 1, No. 1.
Suhan Ree, "Power-Law Distributions From Additive Preferential Redistributions," The American Physical Society, Physical Review E, Dec. 2005, pp. 026115-1-026115-5, vol. 73, No. 2, Part 2.
Everett M. Rogers, "Diffusion of Innovations," The Free Press, Fourth Edition, Feb. 1995, pp. 1-37.
S.T. Roweis et al., "Nonlinear Dimensionality Reduction by Locally Linear Embedding," Science, Dec. 2000, pp. 2323-2326, vol. 290, No. 5500.
A. Sala et al., "Measurement-Calibrated Graph Models for Social Network Experiments," 19th International Conference on World Wide Web (WWW), Apr. 2010, pp. 861-870.
R. Pastor-Satorras et al., "Epidemic Spreading in Scale-Free Networks," The American Physical Society, Physical Review Letters, Apr. 2001, pp. 3200-3203, vol. 86, No. 14.
M.Á. Serrano et al., "Self-Similarity of Complex Networks and Hidden Metric Spaces," Feb. 2008, pp. 078701-1-078701-4, vol. 100, No. 7.
D. Strang et al., "Diffusion in Organizations and Social Movements: From Hybrid Corn to Poison Pills," Annual Review of Sociology, Aug. 1998, pp. 265-290, vol. 24, No. 1.
R. Taylor, "Constrained Switchings in Graphs," Research Report, University of Melbourne, Department of Mathematics, 1980, pp. 314-336.
J. Travers et al., "An Experimental Study of the Small World Problem," Sociometry, Dec. 1969, pp. 425-443, vol. 32, No. 4.
Thomas W. Valente, "Network Models of the Diffusion of Innovations," Computational and Mathematical Organization Theory, Jan. 1995, pp. 163-164, vol. 2, No. 2.
D. Wang et al., "Information Spreading in Context," 20th International Conference on World Wide Web (WWW), Mar.-Apr. 2011, pp. 735-744, Hyderabad, India.
D.J. Watts et al., "Collective Dynamics of 'Small World' Networks," Nature, Jun. 1998, pp. 440-442, vol. 393, No. 6684.
S. Wu et al., "Who Says What to Whom on Twitter," 20th International Conference on World Wide Web (WWW), Mar.-Apr. 2011, pp. 705-714, Hyderabad, India.
N. Saquib et al., "ViSim: A User-Friendly Graphical Simulation Tool for Performance Analysis of MANET Routing Protocols," Mathematical and Computer Modelling, Jun. 2011, pp. 2204-2218, vol. 53.
A. Clark et al., "Guidelines for Considering New Performance Metric Development," Internet Engineering Task Force (IETF), Request for Comments: 6390, Oct. 2011, 46 pages.
W. Sun et al., "Label Switched Path (LSP) Dynamic Provisioning Performance Metrics in Generalized MPLS Networks," Internet Engineering Task Force (IETF), Request for Comments, 5814, Mar. 2010, 88 pages.
S. Corson et al., "Mobile Ad Hoc Networking (MANET): Routing Protocol Performance Issues and Evaluation Considerations," Network Working Group, Request for Comments: 2501, Jan. 1999, 10 pages.
N. Saquib et al., "ViSim: A User-Friendly Simulation Tool for MANET Routing Protocols," BRAC University, Technical Report—TR-BU-CSE001-Oct09, Oct. 2009, 16 pages.

* cited by examiner

(12) United States Patent
US 8,996,341 B2

GENERATING AND EVALUATING EXPERT NETWORKS

FIELD

The field relates to networks and, more particularly, to techniques for evaluating networks.

BACKGROUND

Collaborative networks are a special type of social network formed by members who collectively achieve specific goals, such as fixing software bugs and resolving customers' problems. In such networks, information flow among members is driven by the tasks assigned to the network and the expertise of members.

In networks of software bug fixing and reporting, a given software bug will typically start with a ticket or other report describing the problem. A ticket may be submitted by various individuals, such as a consumer of the software product, software developers testing the product, etc. The ticket is initially routed to a first expert in the network. The first expert may be a dispatcher, who analyzes the ticket and determines an appropriate expert to solve the ticket. The first expert may also attempt to solve the ticket without routing. The ticket may be routed among several experts until a given one of the experts is able to solve the ticket. This process can be inefficient, especially where dispatchers and experts lack sufficient knowledge of the expertise of other experts in the network.

SUMMARY

Embodiments of the invention provide techniques for generating and evaluating collaborative network models.

For example, in one embodiment, a system comprises a modeling component, a routing component, a simulator component and a configuration component. The modeling component is operative to obtain at least one model of at least one collaborative network. The routing component is operative to model at least one routing pattern for one or more nodes of a given collaborative network. The simulator component is operative to simulate one or more virtual network topologies of the given collaborative network using the at least one model and the at least one routing pattern. The configuration component is operative to configure one or more given virtual network topologies on the given collaborative network. The collaborative network comprises a plurality of nodes and one or more edges between pairs of the plurality of nodes. The modeling component, routing component, simulator component and configuration component are executed by at least one processing device.

Further embodiments of the invention comprise one or more of the following features.

The at least one model is a graphical model of at least one human network.

The one or more virtual network topologies are simulated to optimize one or more network performance metrics of the given collaborative network. The one or more network performance metrics comprise at least one of an in-degree distribution of a number of incoming edges for each of the one or more nodes of the given collaborative network, an out-degree distribution of a number of outgoing edges for each of the one or more nodes of the given collaborative network, and a clustering coefficient measuring a number of edges for a given node in the given collaborative network. An incoming edge represents a connection which is received at a node and an outgoing edge represents a connection which originates at a node.

The routing model identifies the number of edges required to route information between nodes in the given collaborative network until the information is received by a destination node. The routing model identifies the number of edges by reading historical routing data from a database and creating stochastic models to emulate routing behavior of nodes, wherein the emulated routing behavior is based at least in part on actual route information observed from historical data.

Advantageously, one or more embodiments of the invention allow for optimizing the structure of collaborative networks.

These and other embodiments of the invention will become apparent from the following detailed description of illustrative embodiments thereof, which is to be read in connection with the drawings.

DETAILED DESCRIPTION

Illustrative embodiments of the invention may be described herein in the context of exemplary methods, apparatus and systems. However, it is to be understood that embodiments of the invention are not limited to the illustrative methods, apparatus and systems described but are more broadly applicable to other suitable methods, apparatus, devices and systems.

In addition, while various embodiments of the invention are described below in the context of a collaborative network of human experts, embodiments of the invention are not limited solely to use with human expert networks. Instead, embodiments of the invention are more generally applicable to various other network types.

Real-life collaborative networks exhibit significantly different properties compared with other complex networks. Real-life collaborative networks, including human expert networks, have a truncated power-law node degree distribution and other organizational constraints. Further, the number of steps along which information is routed follows a truncated power-law distribution. Accordingly, embodiments of the invention use a network model based on these characteristics to develop a routing model which emulates task-driven information routing conducted by human beings in a collaborative network. The network model and routing model can be used to study the efficiency of information routing for different types of collaborative networks and find an optimal configuration for efficient information routing.

Social networks as a means of communication have attracted significant attention from various industries and academia. Such networks can include public social networks like Facebook, Twitter, etc., which support social interactions and information exchange among users. Collaborative networks are another type of social network formed by members who collaborate with one another to achieve specific goals. Such collaborative networks are often Internet-based, such as open source software development sites and customer service centers.

Figure 1:
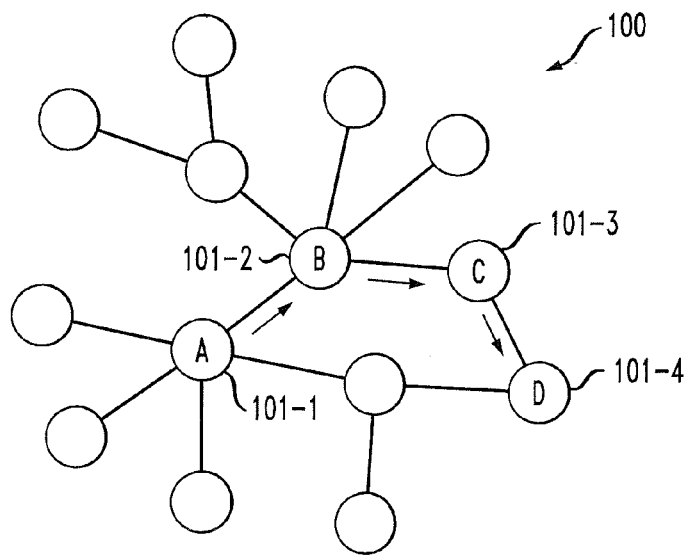
FIG. 1 illustrates a sample network, according to an embodiment of the invention.

Information flow in collaborative networks is drastically different from that in public social networks. In public social networks, information generated at a source spreads through the network with its members' forwarding activities. The forwarding activities fade away as the information loses its value. In collaborative networks, information flow is driven by certain tasks. FIG. 1 illustrates an example of a collaborative network 100. A task is initially assigned to a source, designated node A 101-1 in FIG. 1. The task is routed among nodes in the network until it reaches a node which can complete the task. The purpose of routing is to find the right node or nodes for the task, not to influence others. The routing conducted by a node is based on understanding of the expertise required to complete the task and awareness of other nodes' expertise. In the example of FIG. 1, the task is routed from node A 101-1 to node B 101-2 to node C 101-3 to node D 101-4. For example, in the context of software bug fixing, the bug report is the task or information routed in the collaborative network 100. If a first developer such as node A 101-1 cannot fix the bug, the first developer will route the bug report to a second developer such as node B 101-2 who the first developer thinks is capable of fixing the bug. It is important to note that in this example each developer is associated with one node 101 in the above example. In other arrangements, each node 101 may be associated with a group of experts, developers, persons, etc.

The structure of collaborative networks usually evolves to facilitate execution of tasks. One measure of the efficiency of collaborative networks is the number of steps it takes to navigate a task through a network to reach a node capable of completing the task. In the FIG. 1 example, the task it routed to four nodes. In the context of customer support service, such as a call center, optimizing the staffing structure based on the expertise of agents of the service and interactions between agents can reduce costs, shorten the response time, etc. However, optimizing a collaborative network is difficult to implement without experimenting by altering the network itself. Accordingly, a need exists for techniques, apparatus and systems for optimizing collaborative networks.

Embodiments of the invention address this need by using a simulation-based approach that allows various hypotheses to be tested with low cost. In general, a collaborative network can be characterized in terms of two aspects, a network structure and information routing. As such, embodiments of the invention utilize a network model that captures the key characteristics of a collaborative network which can be used to simulate network performance given various structural constraints. Embodiments of the invention also utilize a routing model that simulates routing of task-related information in the collaborative network.

Figure 2:
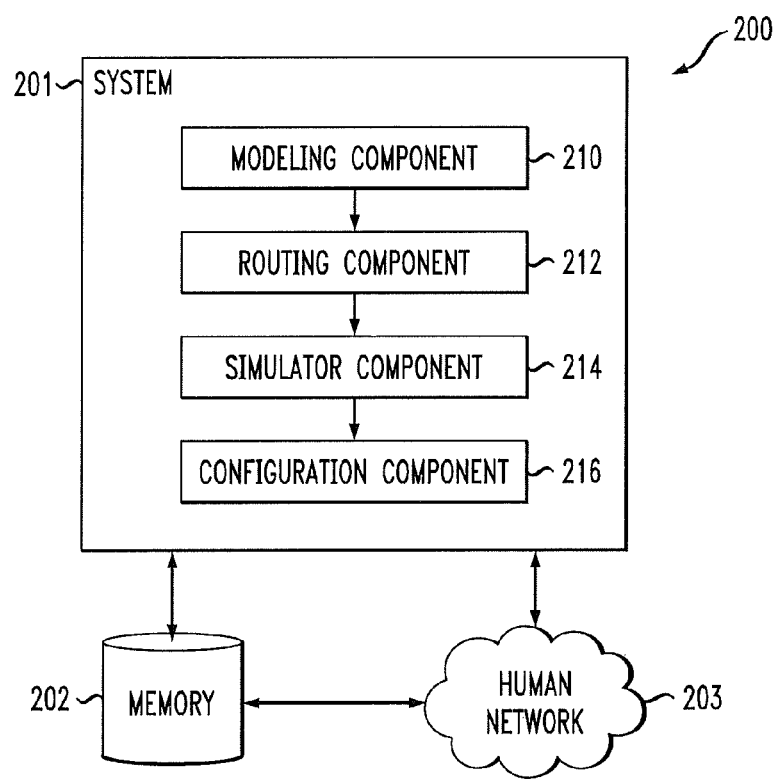
FIG. 2 illustrates a system for evaluation a network, according to an embodiment of the invention.

FIG. 2 shows a system 201 which includes a modeling component 210, a routing component 212, a simulator component 214 and a configuration component 216. The system interacts with a memory 202 and a human network 203 in an environment 200. The modeling component 210 is operative to obtain a model of the human network 203. Although only a single human network 203 is shown in FIG. 2, the system 201 may interact with any number of human networks. In addition, human network 203 may be a collection of human networks. The memory 202 may include one or more databases. The routing component 212 models routing patterns for nodes in the human network 203. The routing component may analyze the model obtained by the modeling component to model the routing patterns. The simulator component 214 simulates virtual network topologies of the human network 203 using the routing patterns modeled by the routing component 212. The configuration component 216 configures one of the simulated virtual network topologies on the human network 203. The human network 203 includes a number of nodes or experts and edges between pairs of the nodes.

The model obtained by the modeling component 210 may be a graphical model of the human network 203. The model can be generated in part based on historical data of the human network 203. The historical data can be stored in the memory 202 in one or more databases. The routing component 212 can analyze the historical data to determine the routing patterns of the human network 203.

Embodiments of the invention model collaborative networks using a truncated power-law node degree distribution as follows:

$$P(k) \propto k^{-\alpha} \text{ where } k \epsilon (k_{min}, k_{max}) \qquad (1)$$

where k is the node degree. The power-law scaling parameter of the distribution for collaborative networks falls within $\alpha \epsilon (1,2)$, in contrast to the commonly reported power-law scaling parameter range of $\alpha \epsilon (2,4)$. Both the incoming degree and outgoing degree distribution follow roughly the same power-law distribution. The smaller value of the power-law scaling parameter indicates that, in a collaborative network, the probability P(k) decreases more slowly as k increases. This distinctive property leads to the consequent effect that the node degrees are bounded. The distribution $P(k) \propto k^{-\alpha}$ does not have a converged mean $\Sigma_{k=1}^{\infty} kP(k)$. However, in reality, the degrees of the nodes do have a mean value. This mismatch implies that the degree distribution is bounded: $P(k) \propto k^{-\alpha}$ where $k \epsilon [k_{min}, k_{max}]$. The reason for this distinctive property is that interactions in a collaborative network have more realistic constraints than those in an ordinary social network or the Internet or other complex networks. For example, in a collaborative problem solving environment, it takes a significant amount of time for a person to establish close interactions with other persons. As discussed above, the number of routing steps to complete a task is a critical measure of efficiency in collaborative networks. The routing steps follow a truncated power-law distribution, with a scaling parameter $\alpha \epsilon (3.5, 4.5)$.

It is important to note that embodiments of the invention are not limited solely to the specific scaling parameters a discussed above, but instead are more generally applicable to a variety of scaling parameters used to model networks.

Human network 203 may be modeled as a number of nodes, and edges between pairs of nodes. The simulator component 214 may model a number of virtual network topologies to optimize one or more network performance metrics of the human network 203. Various network performance metrics may be used. One example of a network performance metric is an in-degree distribution of a number of incoming edges for each node. An incoming edge represents a connection or routing to a given node. Another example of a network performance metric is an out-degree distribution of a number of outgoing edges for each node. An outgoing edge represents a connection or routing from a given node. Clustering coefficients are another network performance metric, which measure the number of edges, incoming and outgoing, for each node.

The clustering coefficient measures how closely the neighbors of a node are connected. For example, the clustering coefficient may be determined by calculating the number of connected triplets in a network that are closed triplets. In an undirected graph, the local clustering coefficient of node i is defined as follows:

$$c_i = 2t_i/(k_i(k_i-1)) \quad (2)$$

where $k_i$ is the degree of node i, and $t_i$ is the number of edges between i's neighbors. The global clustering coefficient is the average of the local clustering coefficients over all nodes in the network. To calculate the clustering coefficient in collaborative networks such as human network 203, the direction (incoming or outgoing) of the edge is ignored.

The network model obtained by the modeling component 210 must take into account structural constraints of the human network 203 such as degree distributions and clustering coefficients. The routing component 212 must similarly model the routing pattern to follow the power-law distribution. To model the network, the location of each node in a network is determined. Next, edges are added between pairs of nodes representing the interactions among nodes. Then, the network model is tuned to capture interactions among nodes with similar expertise using clustering coefficients.

The modeling component 210 of system 201 obtains a network model of the human network 203. The term "obtain" should be construed broadly to encompass various methods of retrieving and generating information and/or models. For example, the modeling component 210 may obtain an existing model of the human network 203 from memory 202. The modeling component 210 may also retrieve information from memory 202 such as historical data related to the human network 203 to generate the network model.

To graphically model a collaborative network with N nodes, each node $i \in \{1, 2, \ldots, N\}$ is assigned a random coordinate $(x_i, y_i)$ where $x_i, y_i \in [0, L]$ in a two-dimensional rectangular area, simulating an expertise space. The coordinates of a node represent the specific expertise of one or more members of the node. Thus, two nodes with similar expertise tend to be close to each other. Different collaborative networks can have different expertise distributions. To make a general model, a simplified representation of the expertise space and node distribution is used where the nodes are uniformly distributed in a rectangular expertise space. Thus, different expertise areas have the same representation in the generated nodes. This general model, however, can be substituted with specific configurations for a given collaborative network.

Figure 3:
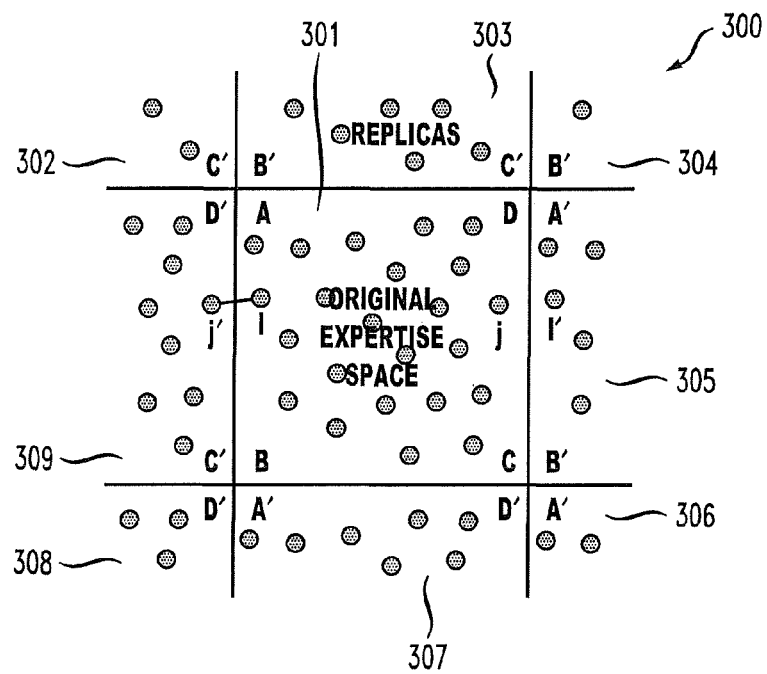
FIG. 3 illustrates boundary conditions in a network, according to an embodiment of the invention.

Because the expertise space is limited to a rectangular area, nodes located at the center of the area are likely to have more neighbors than those located close to the boundary. To model the relationship between different expertise areas, a periodic boundary condition that replicates the expertise area around the areas of interest are applied. FIG. 3 shows an example boundary space 300. The original expertise space 301 is initially placed and replicated expertise spaces 302, 303, 304, 305, 306, 307, 308 and 309 surround the original expertise space 301. The distance $d_{i,j}$ between any pair of nodes i and j is defined as the minimum Euclidean distance between copies of i and j. In this way, each node is given a roughly equal-sized neighborhood.

In a collaborative network, an edge from node i to node j exists when node i can transfer a task to node j. The establishment of an edge requires node j to expose its expertise sufficiently to other nodes, and node i to be aware of node j's exposed expertise. Only with these conditions will node i transfer a task to node j, when i believes j has the appropriate expertise to complete the task. As such, modeling component 210 may use two metric for each node to guide edge generation in the network model: an expertise awareness coefficient and an expertise exposure coefficient.

For each node i in the network, its expertise awareness coefficient $a_i$ and its expertise exposure coefficient $e_i$ are random variables that follow probability distributions $a_i \sim P(a)$ and $e_i \sim P(e)$, respectively. An edge from node i to node j exists if and only if their awareness and exposure coefficients are large enough to cover the distance between i and j, $a_i \times e_i > d_{i,j}$.

To simulate a network with certain incoming and outgoing node degree distributions, the probabilities $P(a)$ and $P(e)$ are tuned. Generally, the awareness and expertise coefficients have the same distribution and thus knowing the form of one distribution allows for solving the other.

If the distribution of the exposure coefficient is $P(e) = \beta \times e^{-\gamma}$ where $e \in [e_{min}, e_{max}]$, the probability that $edge_{i,j}$ exists, given the distance between node i and node j, can be calculated as follows:

$$P(edge_{i,j}) = \begin{cases} 1 & d_{i,j} \le a_i \times e_{min} \\ P(e_j > d_{i,j}/a_i) & e_{min} < d_{i,j}/a_i \le e_{max} \\ 0 & \text{otherwise} \end{cases} \quad (3)$$

When the nodes are uniformly distributed over the rectangular area, the node density $\rho$ is a constant. Therefore, given the awareness coefficient $a_i$, the outgoing degree $k_{out}^i$ of node i is:

$$k_{out}^i = \int_{d_0=0}^{inf} \rho \times 2\pi d_0 P(edge_{i,j}) d(d_0) = \rho \times \pi (a_i e_{min})^2 + \int_{e_0=e_{min}}^{e_{max}} \rho \times 2\pi a_i^2 e_0 P(e_j > e_0) d(e_0) \quad (4)$$

Thus, $k_{out}^i$ can be expressed as $ba_i^2$, where b is a constant. To guarantee that the outgoing degrees of the nodes follow the desired power-law distribution $P(k_{out})^{-\alpha}$, where $k_{out} \in [k_{min}, k_{max}]$, the awareness coefficient must have the following probability distribution:

$$P(a) = \lim_{\Delta a \to 0} \frac{P(a \le a_i \le a + \Delta a)}{\Delta a} \quad (5)$$

$$= \lim_{\Delta a \to 0} \frac{P(ba^2 \le k_{out} \le b(a + \Delta a)^2)}{\Delta a}$$

$$= \lim_{\Delta a \to 0} \frac{cb^{-\alpha+1}((a + \Delta a)^{-2\alpha+2} - a^{-2\alpha+2})}{(-\alpha + 1)\Delta a}$$

$$= 2cb^{-\alpha+1} a^{-2\alpha+1}$$

That is, the awareness coefficient also follows a power-law distribution with coefficient $-2\alpha+1$. According to the symmetric assumption between the exposure and awareness coefficients, the exposure coefficient follows the same power-law distribution with coefficient $-2\alpha+1$.

The range of the awareness and exposure coefficients should be set such that the degrees are restricted to the desired range. In Equation (5), a node with minimum awareness coefficient $a_{min}$ is expected to have the minimum outgoing degree $k_{min}$; a node with the maximum awareness coefficient $a_{max}$ is expected to have the maximum outgoing degree $k_{max}$. Thus, $$a_{min} = e_{min} = \sqrt{\frac{k_{min}}{\rho \times \pi \langle e^2 \rangle}} \quad (6)$$

$$a_{max} = e_{max} = \sqrt{\frac{k_{max}}{\rho \times \pi \langle e^2 \rangle}}$$

where $\langle e^2 \rangle$ is the expected value of the squared exposure coefficient.

Given the power-law coefficient and the range of the awareness and exposure coefficients, their distributions are properly normalized. Using the normalized distributions, edges can be generated in the network model with the probability given in Equation (3), so that the incoming and outgoing degrees of the nodes follow the desired power-law distribution.

The clustering coefficient indicates how closely nodes of the collaborative network work together in expertise domains. A higher clustering coefficient means that there is more collaboration between members within local expertise domains. To model collaborative networks with different expertise domains, the network model needs to form local teams of nodes that have specific expertise for certain. Members with expertise in similar domains tend to interact more with each other when working on these tasks. Consequently, the network should have more links between nodes inside the same expertise domain, and fewer links between nodes in different or unrelated expertise domains. Nodes in unrelated expertise domains are less likely to interact with one another, but such connections exist in collaborative networks. Nodes with high connectivity often reach beyond their own expertise domains.

Figure 4:
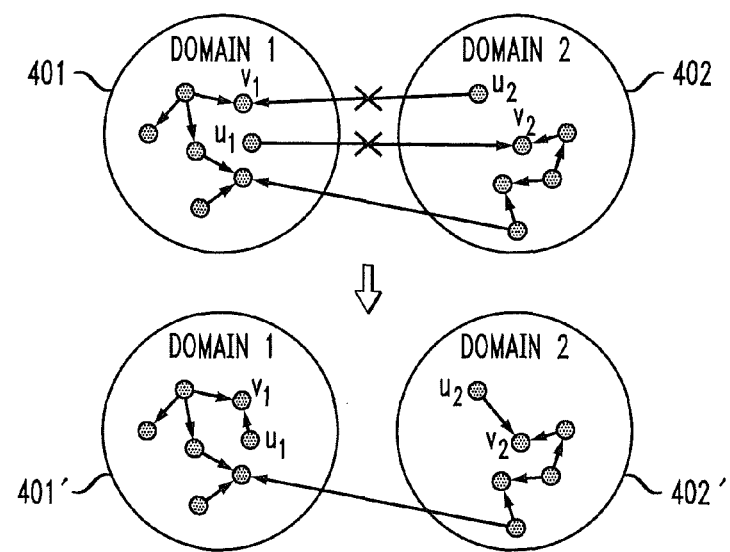
FIG. 4 illustrates edge swapping, according to an embodiment of the invention.

FIG. 4 illustrates an example of how to model this behavior. Nodes $v_1$ and $u_1$ are associated with domain 1 401 and nodes $u_2$ and $v_2$ are associated with domain 2 402. Inter-domain links, such as those shown in FIG. 4 between $u_2$-$v_1$ and $u_1$-$v_2$, are broken. The broken links are replaced with intra-domain links. The inter-domain links between $v_1$-$u_2$ and $u_1$-$v_2$ are replaced with intra-domain links between $v_1$-$u_1$ in domain 1 401' and $u_2$-$v_2$ in domain 2 402'. The process of breaking inter-domain links and replacing them with intra-domain links is referred to herein as edge swapping. At each step of the edge swapping process, pairs of inter-domain edges pointing in opposite directions are chosen and assigned a swapping probability according to the degree of the nodes to which they connect. If the connected nodes have high incoming or outgoing degrees, the edges are swapped with low probabilities; otherwise, edges are swapped with high probabilities.

In the example of FIG. 4, the edge swapping probability is defined as $$p = 1 - \max(k_{out}^{u1}, k_{in}^{v2}, k_{out}^{u2}, k_{in}^{v1})/k_{max} \quad (7)$$

where $k_{max}$ is the maximum outgoing/incoming degree among all nodes in the network. With probability p, the edges $u_1 \rightarrow v_2$ and $u_2 \rightarrow v_1$ are broken, and edges $u_1 \rightarrow v_1$ and $u_2 \rightarrow v_2$ are created. The edge swapping process is repeated until a certain fraction of the inter-domain edges have been swapped to intra-domain edges. The edge swapping process prefers to break inter-domain connections from nodes with low degrees and to maintain the edges for well-connected nodes. Thus, isolated subgraphs are avoided during the edge swapping process, and the resulting network model matches real collaborative networks. With these adjustments, the node degree distribution will still fit the desired power-law distribution. The more edge swapping one performs, the higher the local connectivity the network has within each domain. The resulting networks have higher clustering coefficients.

For a network with a fixed number of nodes, as the number of domains increases, the average size of a domain decreases. Consequently, the edge density inside each domain increases and the clustering coefficient increases. After forming local domains, the generated network model has the desired incoming/outgoing degree distribution, and approximates the clustering coefficients of real collaborative networks.

The task-driven routing model captures the behavior of humans in routing tasks to appropriate experts. Although the small-world phenomenon is observed in collaborative networks, i.e., a relatively short path typically exists between any pair of nodes, there is no guarantee that members in a collaborative network are able to route tasks through these short paths. In fact, the number of routing steps for a task typically follows a truncated power-law or heavy-tailed distribution. Consequently, a considerable number of tasks are routed along a long sequence of steps before they reach the resolvers. A commonly used model in the Internet and in social networks is greedy routing. The greedy routing algorithm assumes that there exists a distance between any pair of nodes. In each routing thread, a node has access to the distance from itself and its neighbors to the destination node. If there exists one or more neighbors closer to the destination than the current node, greedy routing models route the packet to the neighbor node closest to the destination. Otherwise, the node does not have a better routing choice than itself. In this case, the packet fails to reach the destination.

Greedy routing models, however, are not adequate for simulating human task routing behavior. First, the greedy algorithm is deterministic, and often fails to navigate a task if the current task holder does not have a better choice. In contrast, human experts almost always successfully route a task. Second, the routing steps generated by the greedy algorithm follow an exponential distribution. As the number of routing steps increases, the probability drops much more quickly than the power-law distribution. In real decision-making scenarios, a human tends to make different routing decisions when the situations, such as availability of neighbors, priority of tasks, etc., are changing, even given similar tasks. Therefore, a better model is required to incorporate the stochastic process of task routing essential for modeling human behavior in collaborative networks.

In a collaborative network, nodes make their task routing decision based on many factors, including the availability of neighbor nodes, priority of tasks, etc. A node often makes a decision based on the local information available, rather than the global information that can be used to optimize the end-to-end routing efficiency. Thus, the same task can be transferred by a member along various non-optimal paths in different situations. Therefore, information routing in a collaborative networks is a stochastic process, rather than a deterministic process.

Embodiments of the invention thus use a Stochastic Greedy Routing (SGR) model based on the intuition that when a node in a collaborative network cannot finish a task, the node tends to transfer the task to a neighbor node who has expertise closer to that of the resolver, similar to a greedy approach. The node also evaluates the connectivity of neighbor nodes, and tends to select a neighbor node that has more outgoing connections, assuming that a better-connected neighbor is more likely to route the task along a shorter path to the resolver.

The SGR model assumes that each node relies on only local information to route tasks to one of its neighbor nodes, following a stochastic process. Considering a task that is initially assigned to node u and has a resolver v, the SGR model guides each node to navigate the task through the network, from the initiator u to the resolver v. At each step, when a non-resolver node holds a task, it evaluates the candidate set C, consisting of all its neighbors who have not yet been visited, and transfers the task to one of them. In some rare cases, the candidate set becomes empty and all the neighbors are marked as visited. As mentioned above, the task should be transferred to a node with closer expertise to that of the resolver and with a higher outgoing degree. Therefore, for each candidate i, the routing component 212 defines the following utility function:

$$F(i)=d(i,v)^{-1} \times k_{out}^i \quad (8)$$

Note that this utility function is inversely proportional to d(i,v), the geometric distance between a candidate and the resolver in the network model, which represents the similarity in their expertise. The holder of a task transfers the task to one of the candidates i∈C with a probability proportional to i's utility, $$P(i)=F(i)/\Sigma_{j \in C} F(j) \quad (9)$$

This process is repeated until the task reaches the resolver. The SGR model does not rely on the nature of the tasks to perform routing and thus avoids the issue of generating synthetic tasks. Instead, it needs only a pair of initiators and resolvers to simulate a task, which significantly simplifies the model.

The SGR model may alternately use a variable probability distribution to choose a forwarding neighbor. When a node i has a task with a target node j, for each neighbor N of node i, the SGR model can calculate a gain function as follows:

$$G(N)=d(N,j)^{-a} K_N^b \quad (10)$$

Different values of the parameters a and b in G(N) can indicated different transfer strategies. For example, in transferrer essential routing, a larger b is used to emphasize outgoing degree. In resolver essential routing, a larger a is used to emphasize the distance to the resolver.

The SGR model assumes that each node can evaluate the geometric distance between its neighbors and the resolver, without knowing the topology of the entire network. In the network model, geometric distances between nodes represent similarity in the expertise of the node. Although the current holder of a task does not know the shortest path to the resolver, the current holder has knowledge of what expertise is required to complete the task as well as knowledge of the expertise of neighbor nodes. Thus, the holder can make a judgment as to which one of the neighbor nodes is a better fit toward completing the task.

Figure 5:
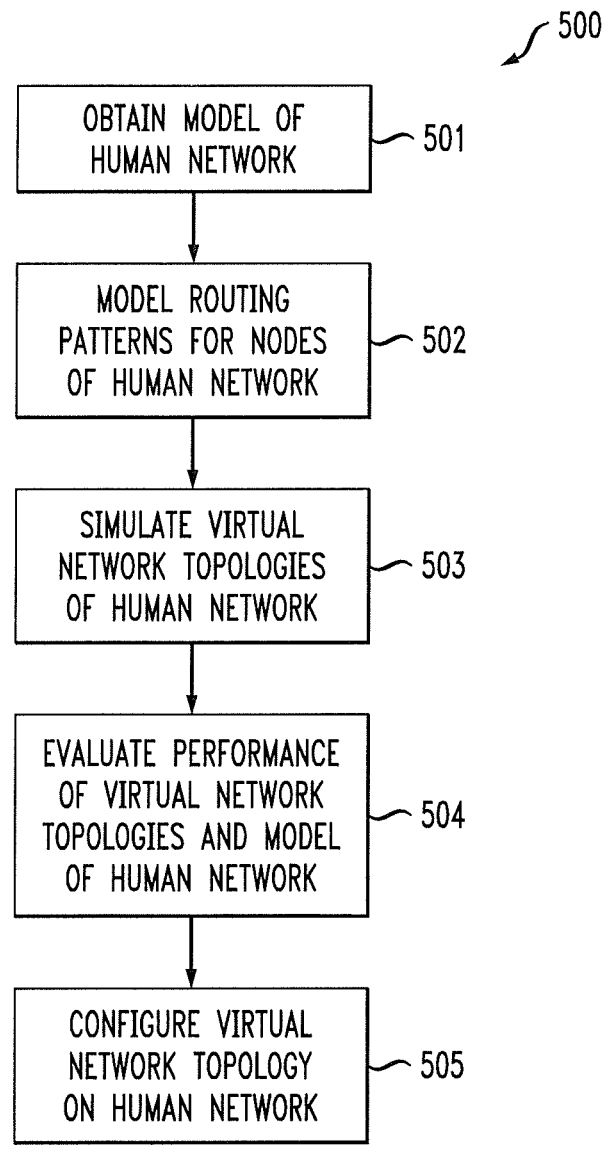
FIG. 5 illustrates a network evaluation methodology, according to an embodiment of the invention.

FIG. 5 illustrates a methodology 500 which may be used in embodiments of the invention. The method begins with obtaining 501 a model of a human network. As discussed above, the model may be a graphical model of the human network. The model may be generated from historical data of the network or may be retrieved from a database.

The methodology continues with modeling 502 routing patterns for nodes of the human network. This step may include identifying a number of edges required to route information between nodes in the human network until the information is received by a destination node. The information may represent an unsolved problem, and the destination node is a node capable of solving the unsolved problem. Identifying the number of edges required to route information can include reading historical routing data from a database and creating stochastic models to emulate routing behavior of nodes. The emulated routing behavior can be based at least in part on actual route information observed from historical data.

The methodology continues with simulating 503 virtual network topologies of the human network. The simulations may be used to optimize one or more network performance metrics of the human network. The network performance metrics, as discussed above, may include in-degree distributions of incoming edges, out-degree distributions of outgoing edges, and clustering coefficients. The virtual network topologies may be subject to one or more physical constraints of the human network. Physical constraints can include an organizational hierarchy of the nodes in the network and a geographic distribution of nodes in the network.

The methodology continues with evaluating 504 the performance of the virtual network topologies and model of the human network. The performance may be based on a routing performance measured by the number of edges required to route information between nodes in the human network. The step of evaluating 504 the performance of the virtual network topologies may further include identifying a recommended network topology based on the performance. This step may also include generating performance reports for each of the virtual network topologies. Each report may include information on various quality metrics such as the number of edges required to route tasks, the number of nodes required to route tasks, the estimated time required to complete tasks, and the estimated number of unsolved tasks. The methodology concludes with configuring 505 one of the network topologies on the human network.

Figure 6:
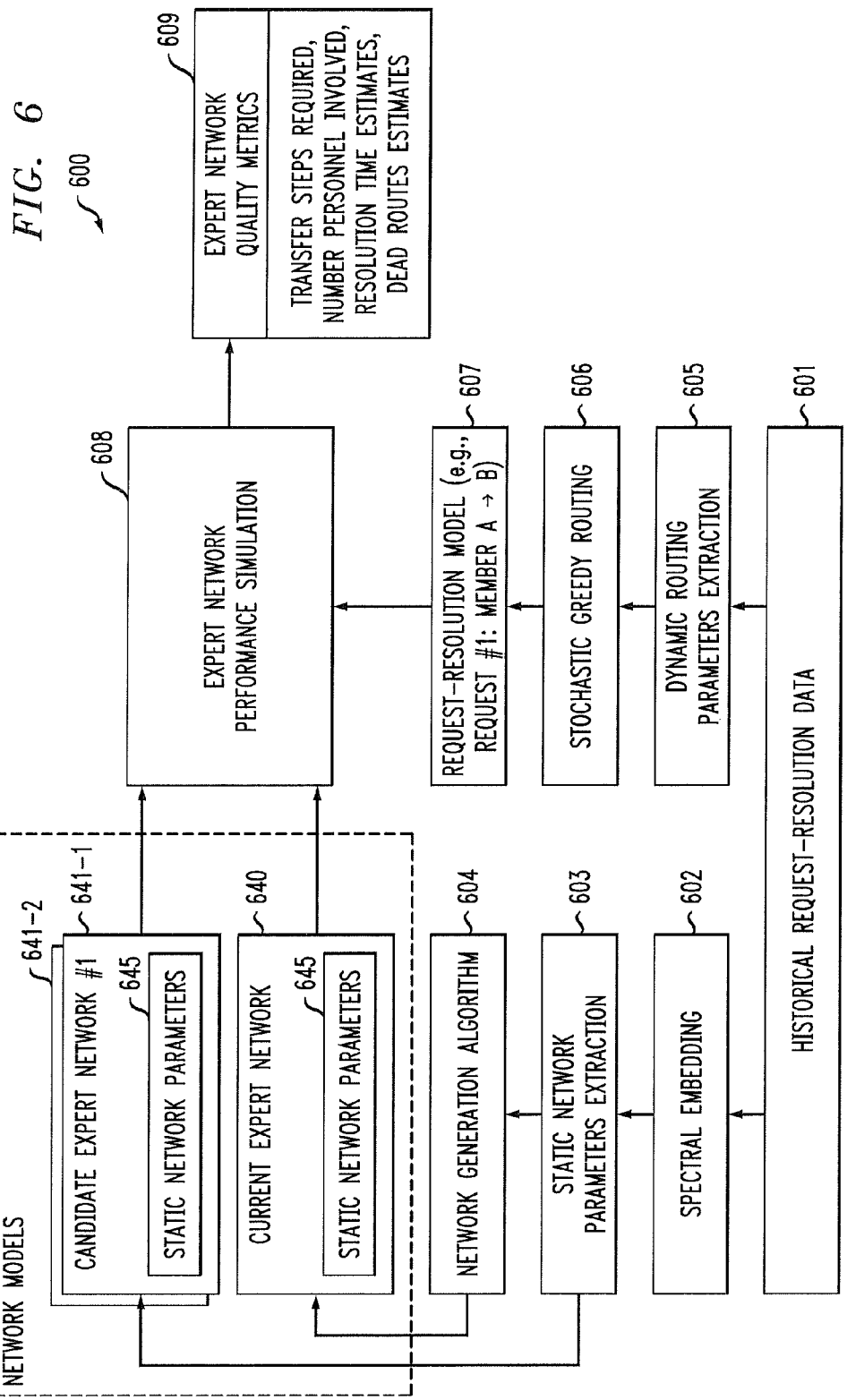
FIG. 6 illustrates another network evaluation methodology, according to an embodiment of the invention.

FIG. 6 illustrates a process 600 for evaluating collaborative networks. Historical request-resolution data 601 is used to create network models and a routing model. To create the network model, spectral embedding 602 is performed on the historical data. Next, static network parameters extraction 603 is performed as described above. The static network parameters 645 are used to create candidate expert network models 641-1 and 641-2. The network generation algorithm 604 generates a current expert network model 640 using the static network parameters 645. The historical request-resolution data is also used to extract dynamic routing parameters 605. Next, stochastic greedy routing 606 models routing patterns based on the dynamic routing parameters. The request-resolution model 607 creates the routing models. The various network models 640, 641-1 and 641-2 along with the request-resolution model 607 are input into expert network performance simulation 608. After simulating the network and routing models, expert network performance simulation 608 generates expert network quality metrics 609. Such metrics, as described above, can include the transfer steps required, number of personnel or nodes used to route tasks, estimates of resolution time for tasks, and estimates of the number of dead routes or unsolved tasks.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be but are not limited to, for example, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring again to FIGS. 1-6, the diagrams in the figures illustrate the architecture, functionality, and operation of possible implementations of systems, methods and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Accordingly, techniques of the invention, for example, as depicted in FIGS. 1-6, can also include, as described herein, providing a system, wherein the system includes distinct modules (e.g., modules comprising software, hardware or software and hardware).

Figure 7:
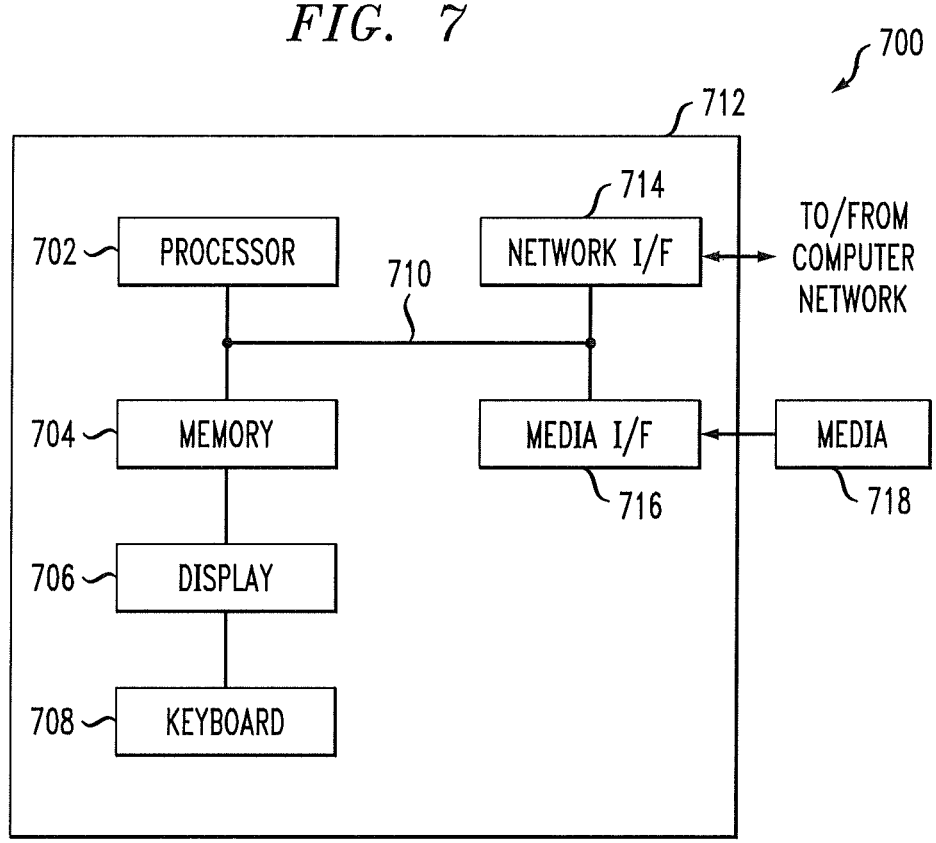
FIG. 7 illustrates a computing device in accordance with which one or more components/steps of techniques of the invention may be implemented, according to an embodiment of the invention.

One or more embodiments can make use of software running on a general purpose computer or workstation. With reference to FIG. 7, such an implementation 700 may employ, for example, a processor 702, a memory 704, and an input/output interface formed, for example, by a display 706 and a keyboard 708. The term "processor" as used herein is intended to include any processing device, such as, for example, one that includes a CPU (central processing unit) and/or other fauns of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to optionally include, for example, one or more mechanisms for inputting data to the processing unit (for example, keyboard or mouse), and one or more mechanisms for providing results associated with the processing unit (for example, display or printer).

The processor 702, memory 704, and input/output interface such as a display 706 and keyboard 708 can be interconnected, for example, via bus 710 as part of a data processing unit 712. Suitable interconnections, for example, via bus 710, can also be provided to a network interface 714, such as a network card, which can be provided to interface with a computer network, and to a media interface 716, such as a diskette or CD-ROM drive, which can be provided to interface with media 718.

A data processing system suitable for storing and/or executing program code can include at least one processor 702 coupled directly or indirectly to memory elements 704 through a system bus 710. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboard 708 for making data entries; display 706 for viewing data; a pointing device for selecting data; and the like) can be coupled to the system either directly (such as via bus 710) or through intervening I/O controllers (omitted for clarity).

Network adapters such as a network interface 714 may also be coupled to the system to enable the data processing system to become coupled to other data processing systems or remote printers or storage devices through intervening private or public networks. Modems, cable modem and Ethernet cards are just a few of the currently available types of network adapters.

As used herein, a "server" includes a physical data processing system (for example, system 712 as shown in FIG. 7) running a server program. It will be understood that such a physical server may or may not include a display and keyboard. Further, it is to be understood that components may be implemented on one server or on more than one server.

It will be appreciated and should be understood that the exemplary embodiments of the invention described above can be implemented in a number of different fashions. Given the teachings of the invention provided herein, one of ordinary skill in the related art will be able to contemplate other implementations of the invention. Indeed, although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A system, comprising:
   a modeling component operative to obtain at least one model of at least one collaborative network;
   a routing component operative to model at least one routing pattern for one or more nodes of a given collaborative network;
   a simulator component operative to simulate one or more virtual network topologies of the given collaborative network using the at least one model and the at least one routing pattern; and
   a configuration component operative to configure a given one of the one or more virtual network topologies on the given collaborative network based on the simulation results;
   wherein the given collaborative network comprises a plurality of nodes and one or more edges between pairs of the plurality of nodes; and
   wherein the modeling component, routing component, simulator component and configuration component are executed by at least one processing device.

2. The system of claim 1, wherein the at least one model is a graphical model of at least one human network.

3. The system of claim 1, wherein the modeling component generates the at least one model based at least in part on historical data of at least one collaborative network.

4. The system of claim 1, wherein the modeling component retrieves the at least one model from a database.

5. The system of claim 1, wherein the one or more virtual network topologies are simulated to optimize one or more network performance metrics of the given collaborative network.

6. The system of claim 5, wherein the one or more network performance metrics comprise at least one of:
   an in-degree distribution of a number of incoming edges for each of the one or more nodes of the given collaborative network, an incoming edge representing a connection which is received at a node;
   an out-degree distribution of a number of outgoing edges for each of the one or more nodes of the given collaborative network, an outgoing edge representing a connection which originates at a node; and
   a clustering coefficient measuring a number of edges for a given node in the given collaborative network.

7. The system of claim 6, wherein the clustering coefficient is a function of at least one of: similarity between expertise of nodes in the given collaborative network and interactions between nodes in the given collaborative network.

8. The system of claim 1, wherein the routing model identifies the number of edges required to route information between nodes in the given collaborative network until the information is received by a destination node.

9. The system of claim 8, wherein the information represents an unsolved problem and the destination node is a node capable of solving the unsolved problem.

10. The system of claim 8, wherein the routing model identifies the number of edges by:
    reading historical routing data from a database; and
    creating stochastic models to emulate routing behavior of nodes;
    wherein the emulated routing behavior is based at least in part on actual route information observed from historical data.

11. The system of claim 1, wherein the given one of the one or more virtual network topologies is configured subject to one or more physical constraints of the given collaborative network.

12. The system of claim 11, wherein the one or more physical constraints comprises at least one of an organizational hierarchy of nodes in the given collaborative network and a geographic distribution of nodes in the given collaborative network.

13. The system of claim 1, wherein the one or more virtual network topologies are simulated subject to one or more physical constraints of the given collaborative network.

14. The system of claim 1, wherein the simulator component is operative to evaluate routing performance of the one or more virtual network topologies, the routing performance being based at least in part on the number of edges required to route information between nodes in the given collaborative network until the information is received by a destination node.

15. The system of claim 14, wherein the simulator component identifies a recommended virtual network topology based at least in part on evaluated routing performance of the one or more virtual network topologies.

16. The system of claim 1, wherein the simulator component is operative to generate at least one performance report comprising quality metrics for at least one of the one or more virtual network topologies.

17. The system of claim 16, wherein the quality metrics comprise at least one of:
- a number of edges required to route each of a plurality of tasks;
- a number of nodes required to route each of a plurality of tasks;
- an estimated time required to complete each of a plurality of tasks; and
- an estimated number of unsolved tasks in a plurality of tasks.

18. The system of claim 1, wherein the given collaborative network is a support network, and each of the plurality of nodes represents a human expert user of the support network.

19. The system of claim 1, wherein the simulator component utilizes a power-law distribution to generate edges among a plurality of nodes in a given virtual network topology.

20. An apparatus comprising:
- a memory; and
- a processor device operatively coupled to the memory and configured to:
- obtain at least one model of at least one collaborative network;
- model at least one routing pattern for one or more nodes of a given collaborative network;
- simulate one or more virtual network topologies of the given collaborative network using the at least one model and the at least one routing pattern; and
- configure a given one of the one or more virtual network topologies on the given collaborative network based on the simulation results;
- wherein the given collaborative network comprises a plurality of nodes and one or more edges between pairs of the plurality of nodes.

21. An article of manufacture comprising a non-transitory computer readable storage medium for storing computer readable program code which, when executed, causes a computer to:
- obtain at least one model of at least one collaborative network;
- model at least one routing pattern for one or more nodes of a given collaborative network;
- simulate one or more virtual network topologies of the given collaborative network using the at least one model and the at least one routing pattern; and
- configure a given one of the one or more virtual network topologies on the given collaborative network based on the simulation results;
- wherein the given collaborative network comprises a plurality of nodes and one or more edges between pairs of the plurality of nodes.

\* \* \* \* \*